April 30, 1935.      O. J. LEINS      1,999,731
THERMOSTAT CONTROL DEVICE
Filed Aug. 3, 1932
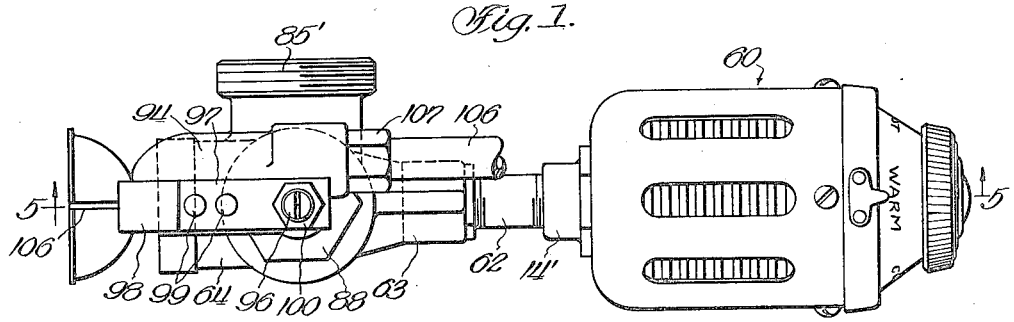
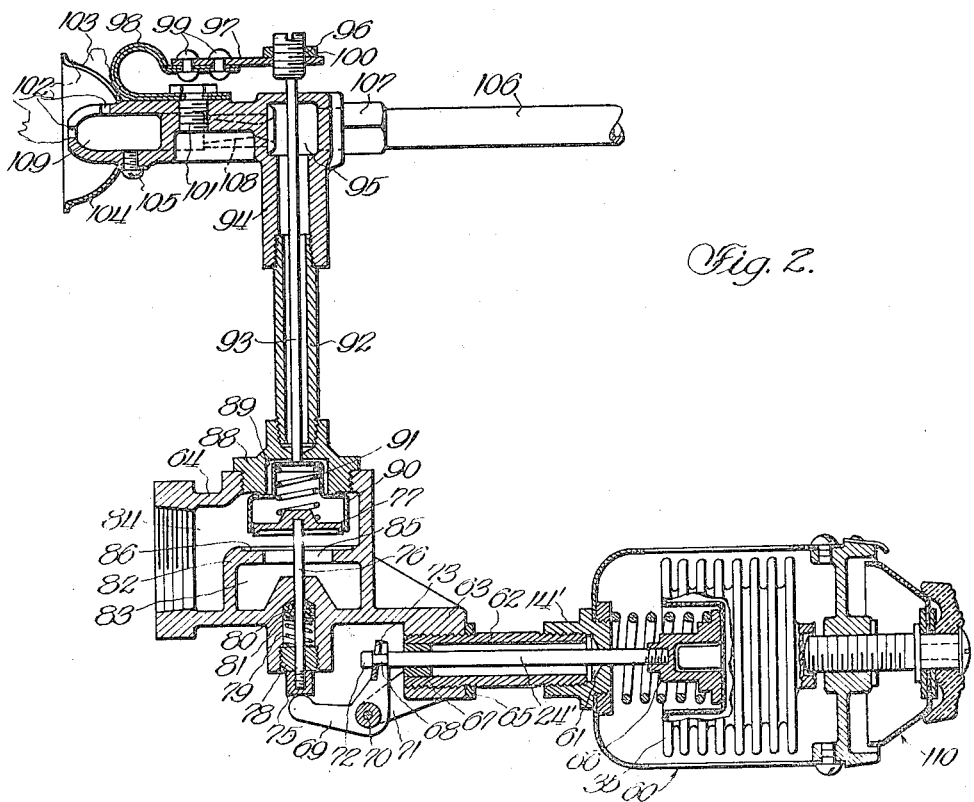
Inventor:
Oscar J. Leins
By Brown, Jackson, Boettcher & Dienner
Attys.

Patented Apr. 30, 1935

1,999,731

UNITED STATES PATENT OFFICE 1,999,731

THERMOSTAT CONTROL DEVICE

Oscar J. Leins, Milwaukee, Wis., assignor to Milwaukee Gas Specialty Company, Milwaukee, Wis., a corporation of Wisconsin Application August 3, 1932, Serial No. 627,346

9 Claims. (Cl. 236—21)

This invention relates to thermostat control devices, and more particularly to control devices for regulating the flow of fuel to space heaters and the like.

In its preferred form, the invention comprises the combination of a thermally controlled fuel supply valve, pilot flame means for the burner of the heating appliance, which pilot flame means is provided with thermally responsive means positioned adjacent thereto, and connecting means for closing the fuel supply valve upon extinguishment of the pilot flame.

In the use of space heaters and other similar appliances using fluid fuel for heat energy, the flow of fuel to the burner of the appliances controlled is by a fuel supply valve, which is opened or closed in accordance with temperature variations within the enclosure being heated. The mechanism employed in the present invention for controlling the operation of the valve comprises an expansible bellows containing a volatile liquid responsive to thermal changes in the enclosure, the expansion and contraction of the bellows closing and opening the valve in accordance with increasing or decreasing temperatures within the enclosure.

In most heaters used for this purpose, the fuel flowing to the burner of the appliance is ignited by a pilot flame which receives its fuel supply from the same source as the burner. In the present invention, I provide means for maintaining a pilot flame within the space heater comprising a pilot head of the same general type as that shown in the copending application of Harold A. Mantz, Serial No. 560,412, filed August 31, 1931, with a connection between the pilot head and the fuel supply valve for shutting off the valve upon extinguishment of the pilot flame, to prevent unignited gas issuing from the burner. During normal operation of the device, the pilot head connection in no way affects the operation of the fuel supply valve.

This combination of the thermally controlled fuel supply valve and the pilot flame connection thereto possesses all of the advantages of the thermally controlled valve for controlling the fuel supply, while the feature of the pilot head connection insures that no unignited fuel will escape from the burner when the pilot flame is unignited.

Other features and advantages of the invention will appear more fully in the following detailed description, which, together with the accompanying drawing, will disclose to those skilled in the art the particular construction and operation of a preferred form of my invention.

In the drawing:—

Figure 1 is a plan view of a combined thermostat control device and pilot flame head; and Figure 2 is a sectional view taken substantially on the line 5—5 of Figure 1.

Referring now in detail to the embodiment of my invention shown in Figures 1 and 2, in which I have disclosed a thermostat controlled device in combination with a safety pilot flame attachment, the control device is indicated generally by the reference numeral 60. The threaded bushing 14' is provided with a recess 61 adapted to receive the nipple 62, the nipple 62 threading, at its opposite end, into a lateral extension 63 of the valve body 64. A lock nut 65 serves to hold the nipple securely threaded within the valve body.

The stem or push rod 24' extending from the cap member 66 is supported at one end by the threaded bushing 14', and at its other end extends through a bushing 67 carried within the nipple 62. The projecting end of the stem 24' is provided with a portion of reduced diameter, indicated at 68, which is adapted to fit within a bifurcated end of a bell crank member 69, the bell crank member being pivoted about a pin 70 carried between two arms 71 extending from the lateral extension 63 of the valve body. The outer end of the stem 24' is provided with an enlarged portion 72 for holding the stem in abutting engagement with the slotted end 73 of the bell crank 69.

The other end of the bell crank 69 has abutting engagement with a stud 75 carried at the outwardly projecting end of the valve stem 76, the valve member 77 being shown in its full open position in Figure 5, with the stud 75 abutting against a bushing 78 threaded into the lower end of the valve body 64.

The stem extends through the bushing 78 and through a recess 79 formed in the lower portion of the valve body, the recess 79 being provided with packing 80 held in position by means of a spring pressed washer 81 for providing a gastight seal for the reciprocatory movement of the valve stem 76.

The valve body 64 is provided with an internal partition wall 82, which divides the valve body into an inlet chamber 83 and an outlet chamber 84. The inlet to the valve is indicated in Figure 4 by the numeral 85', and is connected to any suitable source of fuel supply. The outlet chamber 84 of the valve body is connected to the conduit leading to the burner for the space heater. The partition wall 82 is provided with an opening 85, which opening is provided with a recessed outwardly flanged portion 86 providing a seat for the valve member 77.

Threaded into the upper portion of the valve body 64 is a valve cap 88, which is provided with a recess 89 which receives a valve cover member 90, the valve cover member being substantially cup-shaped and having an outwardly flanged downwardly extending portion extending about the valve member 77 and also engaging upon the valve seat 86 when in depressed position. A spring member 91 normally tends to urge the valve member 77 away from the valve cover 90.

Extending upwardly from the valve cap 88 is a nipple member 92, threaded therein, and providing a passageway for a connecting rod 93 which has abutting engagement with the valve cover 90. At its upper end, the nipple 92 is threaded into pilot head 94, the connecting rod 93 extending upwardly through a recess 95 in the pilot head and terminating in abutting engagement with an adjusting screw 96 carried by a supporting strip 97 secured to a thermally sensitive member indicated at 98.

The thermally sensitive member 98 comprises two metallic strips soldered or otherwise suitably secured together, the two strips having different coefficients of expansion for causing expansion and contraction of the member and consequent warping of same. The supporting strip 97 is carried at the end of the thermally sensitive member 98 by means of a pair of rivets 99, and the adjusting screw 96 is threaded in the supporting strip and fastened by means of a lock nut 100 threaded thereon. The thermally sensitive member is doubled back, and is secured to the upper surface of the pilot head by means of a securing screw 101, which threads into the pilot head and serves to secure the thermally sensitive member in position adjacent the pilot flame ports 102 through which the gas issues to form the pilot flame 103. A dome-shaped shield 104 is secured to the projecting end of the pilot head by means of a screw 105, and is provided with a slotted portion 106 for allowing the pilot flame 103 to extend upwardly into proximity to the thermally sensitive member 98.

It is therefore apparent that the thermally sensitive member 98 is responsive to the pilot flame for causing movement of the supporting strip 97 carrying the adjusting screw 96, this movement serving to cause movement of the connecting rod 93 connected to the valve cover member 90.

The pilot flame ports 102 receive their supply of fuel from a fuel supply conduit 106, which is threaded into the pilot head as indicated at 107, and opens into the recess 95 formed therein. A suitable Venturi bushing, indicated in dotted lines at 108, is provided for the purpose of mixing the fuel supply through conduit 106 with air taken from the recess 95, to form a combustible mixture within the chamber 109 adjacent the pilot flame ports 102. The pilot flame is ignited at this point, and when ignited, causes the thermally sensitive member 98 to warp upwardly, releasing the pressure upon the connecting rod 93, and thus allowing the valve cover member 90 to be forced into the recess 89 by reason of the tension of the spring member 91.

However, when the pilot flame is extinguished, the thermally sensitive member 98 warps downwardly, and the abutting engagement of the adjusting screw 96 upon the upper end of the connecting rod 93 forces the valve cover member 90 downwardly upon the valve seat 86, thus shutting off flow of fuel into the outlet chamber 84 of the valve body.

In operation, the pilot flame 103 is first ignited, and the thermally sensitive member 98 then warps upwardly to release the abutting engagement of the adjusting screw 96 upon the connecting rod 93. The spring 91 thus forces the valve cover member 90 upwardly into the recess 89, where it will be removed from the path of gas flowing through the valve body. The space heater is then ignited, and the thermally responsive bellows 35' serves to control the position of the valve member 77 for allowing an increase or decrease in flow of fuel through the valve in accordance with decreasing or increasing temperatures within the space being heated. This action is effected through the stem 24', which is moved by expansion or contraction of the bellows 35' to rock the bell crank 69 about its pivot 70 for moving the valve stem 76 either upwardly or downwardly in accordance with the contraction or expansion of the bellows 35'.

As shown in Figure 2, the valve member 77 is in its uppermost position, and the maximum quantity of fuel is flowing through the opening 85 into the outlet chamber 84 from the inlet 85'. This flow of fuel is constantly being varied in accordance with movement of the expansible bellows 35', the spring 91 serving to cause the valve stem to be urged downwardly to provide the abutting engagement between the stud 75 and the engaging arm of the bell crank 69. This serves to maintain the bifurcated end 73 of the bell crank in constant abutting engagement with the enlarged head 72 of the stem 24'.

The selecting means, indicated generally at 110, is adapted to control the position of the bellows 35', for permitting the temperature within the enclosure being heated to be maintained at any desired point.

If the pilot flame 103 should be accidentally extinguished, the thermally sensitive member 98 will warp downwardly, forcing the connecting rod 93 downwardly, and thus forcing the valve cover member 90 downwardly against the valve seat 86 against the tension of the spring 91, thus shutting off flow of fuel to the burner. Thus, if it is desired to operate the space heater, and the pilot flame is not ignited, no fuel will be allowed to flow through the valve 64 to the burner of the heater. I thus provide a safety regulating means in conjunction with the thermostat control device for preventing flow of unignited fuel from the burner of the space heater when the pilot flame is unignited.

The adjusting screw 96 may be threaded through the supporting strip 97 to a greater or lesser degree, depending upon the amount of closing desired, and also depending upon the time desired between the extinguishment of the pilot flame and the closing of the valve.

I do not intend to be limited to the exact details shown and described in connection with the illustrated embodiments of my invention, nor to be limited to the exact description of the structure set forth, but only insofar as defined by the scope and spirit of the appended claims.

I claim:—

1. In combination, means for maintaining a pilot flame, thermally sensitive means responsive to said flame, a valve housing having a valve seat, a valve in said housing engageable with said seat, a stem for said valve extending through said housing, means for controlling the movement of said valve comprising an expansible bellows responsive to temperature changes, a push rod carried by said bellows, motion transmitting means between said push rod and said stem, a second valve member adapted to engage said valve seat, and means extending between said thermally sensitive means and said second valve member for closing said second valve upon said seat upon extinguishment of said pilot flame.

2. In combination, means for maintaining a pilot flame, thermally sensitive means responsive to said flame, a valve housing, said pilot flame means being supported on said housing, a valve in said housing, a stem for said valve extending through said housing, means for controlling the movement of said valve comprising an expansible bellows responsive to temperature changes, a push rod carried by said bellows, motion transmitting means between said push rod and said stem, a second valve in said housing coaxial with and disposed over said first valve and means extending between said thermally sensitive means and said second valve for closing said second valve independently of said first valve upon extinguishment of said pilot flame.

3. In combination, means for maintaining a pilot flame, fuel supply means, means for controlling said fuel supply means, thermally sensitive means for actuating the fuel supply controlling means, selecting means for varying the operation of said thermally sensitive means, and means for closing said fuel supply means independently of said controlling means upon extinguishment of said pilot flame comprising a separate reciprocable fuel supply controlling member extending coaxially of said first member and adapted to move relative to said first member for closing said fuel supply means independently of the position of said first member.

4. In a device of the class described, a fuel supply line, a valve housing, a valve member therein having a valve stem and operable to control the quantity of fuel passing through said supply line, thermally sensitive means supported by said housing, a push rod extending in a direction normal to the axis of said valve stem and actuated by said thermally sensitive means, a bell crank pivoted on said housing between said push rod and said valve stem, means supported by said housing for maintaining a pilot flame, and means coaxial with said valve stem and connected to said pilot flame means for shutting off the flow of fuel through said fuel supply line independently of the position of said valve member upon extinguishment of said pilot flame.

5. In combination, a fuel supply line, a fuel supply valve therefor comprising a valve member, a valve stem therefor, and a seat for said valve, thermally responsive bellows adapted to control the position of said valve member, means for maintaining a pilot flame, and thermally actuated means leading from said pilot flame means to said fuel supply valve and terminating in a cover member adapted to enclose said valve member and to engage said seat for shutting off flow of fuel through said fuel supply valve upon extinguishment of said pilot flame.

6. A valve housing having a valve seat formed therein, a first valve member cooperable with said seat, a second valve member extending over said first valve member and adapted to engage said seat, common spring means tending to close one of said valve members and open the other of said valve members, and independent thermally sensitive means for actuating each of said valve members without changing the position of the other valve member.

7. A valve housing having a valve seat formed therein, a valve member in said housing, a valve stem reciprocable for actuating said valve member, a laterally extending integral portion on said housing for supporting a casing extending normally to the axis of said valve stem, an expansible bellows in said casing, means at one end of said casing for receiving a reciprocable push rod supported on said extending portion of said housing at its opposite end, said bellows actuating said push rod in accordance with temperature changes, a bell crank pivoted for movement on said extension and transmitting motion of said push rod to said valve stem, a cover member closing said valve member and engageable with said valve seat, a pilot burner torch-head carried by said valve housing, a thermally sensitive member responsive to the heat of said pilot burner torch-head, a push rod connected between said thermally sensitive member and said cover member, and spring means enclosed within said cover member and biased between said cover member and said valve member.

8. In combination, means for maintaining a pilot flame, thermally sensitive means responsive to said flame, a main housing having a valve seat, a first valve engageable with said seat, expansible bellows supported on said housing and having motion transmitting means for actuating said first valve, a second valve telescoping with said first valve and engageable upon said seat, and means extending between said thermally sensitive means and said second valve for closing said second valve upon said seat upon extinguishment of said pilot flame.

9. In combination, means for maintaining a pilot flame, thermally sensitive means responsive to said flame, a valve housing having a valve seat, a first valve engageable with said seat, expansible bellows supported on said housing and having motion transmitting means for actuating said first valve, means engaging said bellows for selectively adjusting the position of said first valve with respect to said housing, a second valve extending about said first valve and engageable with said valve seat, and means extending between said thermally sensitive means and said second valve for closing said second valve upon said seat upon extinguishment of said pilot flame.

OSCAR J. LEINS.